(12) United States Patent
Maguire et al.

(10) Patent No.: US 6,427,728 B1
(45) Date of Patent: Aug. 6, 2002

(54) CONVEYOR BELTING WITH REINFORCING FABRIC FORMED FROM THREE INTERLACED LAYERS

(75) Inventors: David Joseph Maguire; Jenny Zhaoxia Yu; Frederic Pember Andresen, all of Dublin, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/445,912
(22) PCT Filed: Dec. 14, 1998
(86) PCT No.: PCT/US98/26556
  § 371 (c)(1),
  (2), (4) Date: Dec. 14, 1999
(87) PCT Pub. No.: WO00/35785
  PCT Pub. Date: Jun. 22, 2000
(51) Int. Cl.[7] .......................... B65G 15/34; B29D 29/06
(52) U.S. Cl. .................. 139/383 A; 139/415; 442/226; 442/224; 198/847; 198/957; 474/271
(58) Field of Search .............................. 139/383 A, 415; 442/203, 224, 226; 198/847, 957; 474/271

(56) References Cited

U.S. PATENT DOCUMENTS

| | | | |
|---|---|---|---|
| 3,122,934 A | * 3/1964 | Fihe | 74/232 |
| RE26,731 E | 12/1969 | Robinson | 161/57 |
| 3,523,867 A | 8/1970 | MacBean | 162/348 |
| 3,900,627 A | 8/1975 | Angioletti et al. | 428/114 |
| 4,106,613 A | 8/1978 | Thomson | 198/847 |
| 4,371,580 A | 2/1983 | Morrison et al. | 428/250 |
| 4,407,333 A | * 10/1983 | Fowkes | 139/415 |
| 4,518,647 A | 5/1985 | Morrison | 428/250 |
| 4,813,533 A | 3/1989 | Long | 198/847 |
| 4,870,998 A | * 10/1989 | Westhead | 139/383 A |
| 4,928,812 A | 5/1990 | van Calker et al. | 198/847 |
| 5,495,935 A | 3/1996 | Zabron et al. | 198/847 |

FOREIGN PATENT DOCUMENTS

| | | | |
|---|---|---|---|
| DE | 1806570 | 4/1972 | |
| DE | 2412001 | 9/1975 | |
| WO | 0125519 | 4/2001 | D03D/11/00 |

* cited by examiner

*Primary Examiner*—Andy Falik
(74) *Attorney, Agent, or Firm*—Nancy T. Krawczyk

(57) ABSTRACT

A belting (10) reinforced with at least one fabric ply (16). The fabric ply (16) is a composite fabric (26). The fabric (26) has two woven layers (28, 30) and an intermediate third layer of straight warp yarns (34). The woven layers (28, 30) and straight warp yarns (34) are bound together by a plurality of binder yarns (38). Each layer (28, 30, 34) of the fabric (26) contributes substantially 25–40% to the overall strength of the fabric (26). The composite fabric (26) may be used in a multi-ply belting (10) for heavy duty applications; wherein the fabric ply (26) is the center ply (16) and provides approximately 50 to 75% of the overall belting strength. The fabric (26) may also be used as a single reinforcing ply for light duty application belting.

11 Claims, 5 Drawing Sheets

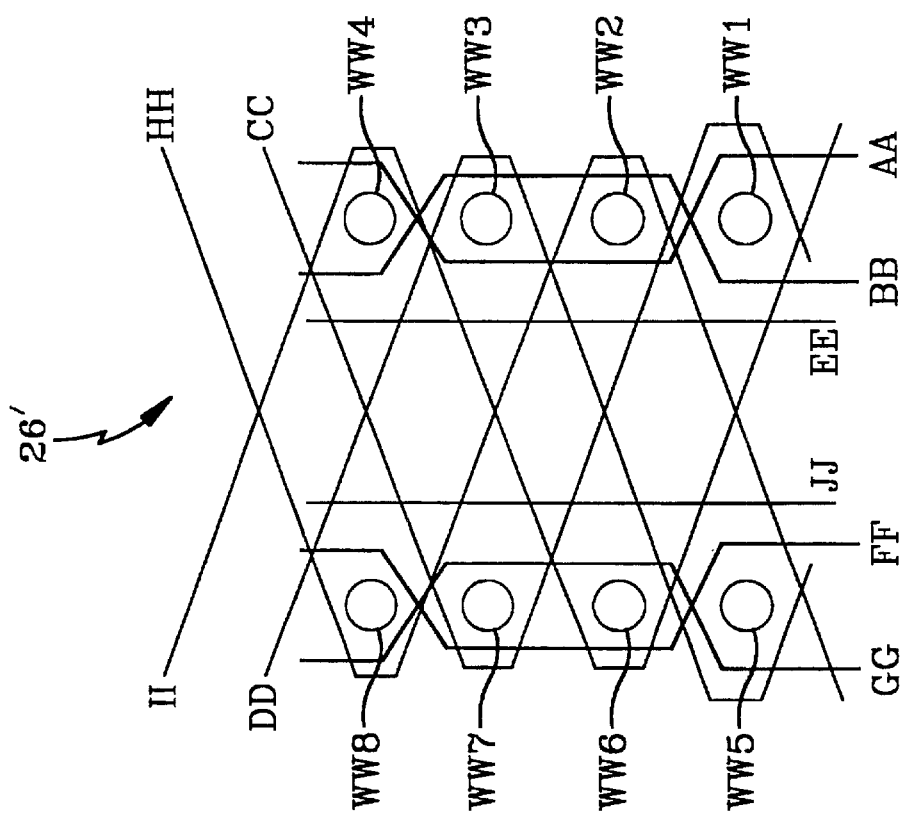
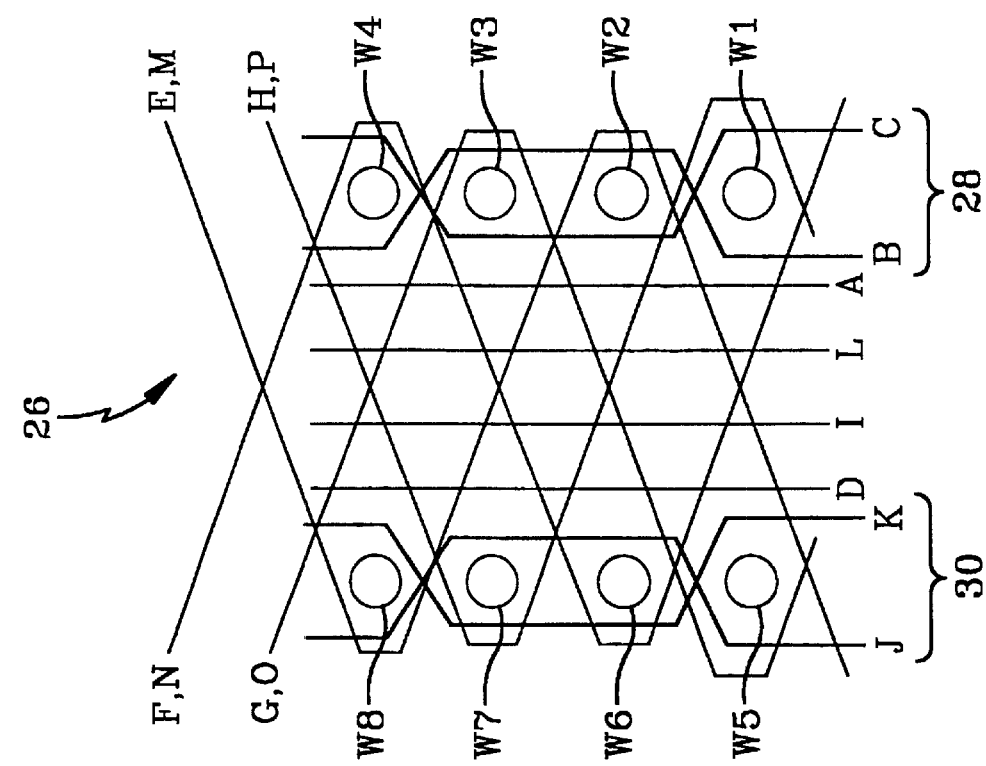

CONVEYOR BELTING WITH REINFORCING FABRIC FORMED FROM THREE INTERLACED LAYERS

TECHNICAL FIELD

The disclosed invention is directed toward an improved construction for a reinforcing fabric for belts. More specifically, the disclosed reinforcing fabric is a composite fabric which provides the belt with superior properties such as high rip resistance, transverse tear resistance, impact resistance, anti-fraying, and flexibility.

BACKGROUND ART

Current conveyor belts are constructed with multiple fabric plies. The belt designs utilize plies of all straight warp or solid woven designs or polyester and nylon multi-ply fabrics. Such singular fabric constructions limit the obtainable physical properties of the belt.

The Morrison patents, U.S. Pat. No. 4,371,580, 4,518,647, all disclose multiple fabric plies within agricultural belting material. The outer fabric plies have less resistance to stretching and a greater flex fatigue life than the inner fabric plies.

Conveyor belting with composite fabric plies are also known in the art.

U.S. Pat. No. 5,495,935 discloses conveyor belting with a multi-layer fabric. The fabric is formed of two woven scrims, with an intermediate elastomeric layer. The woven scrims are connected by a plurality of entangled staple fibers.

U.S. Pat. No. 4,813,533 discloses a conveyor belting formed of two woven layers and an intermediate non-woven mat interconnected by a binder yarn. Prior to being joined, the layers are saturated with a polymeric resin. The resin fills all the voids in each textile fabric layer. One exemplary belting described is suitable for a working tensile load of 200 pounds per inch width, and the composite ply has a thickness of about 0.200 inch, with an overall belt thickness of about 0.700 inch.

U.S. Pat. No. 4,928,812 discloses a PVC conveyor belting with a multi-layer fabric designed for heavy load applications. The reinforcing layer is a composite of three layers, with upper and lower woven fabrics of cotton warp and nylon weft yarns, and an intermediate layer of alternating aramid and cotton load bearing cables with a diameter of 4 to 15 mm. The alternating aramid and cotton load bearing cables are spaced a distance of 0.5 to 2 times the cable diameter. The three layers are connected to each other by pairs of nylon binder yarns.

Conventional straight warp fabric designs are also associated with problems such as fabric stringing and lack of flexibility. Such problems are eliminated by the disclosed invention.

The present invention is directed toward a belting with at least one layer of reinforcing fabric of the inventive structure. The inventive fabric is defined by a composite structure wherein all of the layers of the fabric substantively contribute to the overall strength of the fabric. Due to the contribution of each layer of the composite fabric, the fabric has high rip resistance, transverse tear resistance, impact resistance, anti-fraying, and flexibility than other known and conventional reinforcing belt fabrics. The inventive fabric may be employed as the sole reinforcing structure in a belt or combined with other layers for multiple ply beltings. The number of plies and the combinations employed are dependent upon the desired application for the belting.

SUMMARY OF THE INVENTION

In accordance with the present invention, a reinforcing fabric for a belting is disclosed. The reinforcing fabric is a composite fabric which provides the belt with superior properties such as high rip resistance, transverse tear resistance, impact resistance, anti-fraying, and flexibility.

In accordance with the present invention, the composite has two woven layers and an intermediate third layer of straight warp yarns. Each layer of the fabric, the two woven layers and the third layer, contributes approximately 25–40% to the overall strength of the fabric.

In accordance with a further aspect of the present invention, each layer of the composite fabric contributes substantially equally to the overall strength of the fabric.

In accordance with a further aspect of the present invention, the two woven layers and the intermediate third layer of the composite fabric are bound together by a binder yarns extending from a first woven layer, through the intermediate third layer, to the second woven layer.

In a further aspect of the present invention, the 10 to 75% of the weft yarns of the first and second woven layers may be monofilament cords, thereby increasing the traverse properties of the fabric and the belt formed with the composite fabric.

In one embodiment of the disclosed invention, the belting is reinforced solely with the composite fabric. The composite fabric formed with the selective replacement of the monofilment cords are particularly useful for the single ply belting. The belting is also provided with rubber skim layers on each side of the reinforcing ply. Such beltings are particularly useful for light duty belting and conveyor applications.

In another embodiment of the disclosed invention, a multiple ply belting is disclosed. The composite fabric is the central reinforcing ply, with outer fabric plies and intermediate rubber skim layers. When the composite fabric is combined with other types of reinforcing fabric plies, the composite fabric provides approximately 50 to 75% of the overall belting strength. Multiple composite plies may be used in such multiple ply belting. Such beltings are particularly useful for heavy-duty belting and conveyor applications.

Definitions

"Binder Yarn" denotes yarn that is used to bind together different yarns in a fabric.

"Fabric" denotes a network of essentially unidirectionally extending cords/yarns, which may be twisted, and which may in turn be composed of a plurality of a multiplicity of filaments (which may also be twisted). The fabric is woven and flexible.

"Filament Yarn" denotes yarn that is formed of continuous and equal length strands.

"Spun Yarn" denotes yarn that is formed of a plurality of stands of unequal lengths twisted together to form a yarn.

"Monofilament Yarn" denotes a yarn that is a single continuous strand.

"Warp" refers to a network of essentially unidirectional extending cords/yarns, which extend in the longitudinal direction of the belt.

"Weft" (filling) refers to the cord/yarn placed at right angles to the warp cords/yarns.

"Woven Fabric" refers to the interlacing of two sets of yarn, the warp and weft yarns, at right angles.

"Plain Weave" refers to a type of weave wherein each warp yarn interlaces one yarn at a time with each weft yarn and vise versa. Plain weave fabric has the same appearance on both sides of the fabric.

"Twill Weave" refers to a type of weave wherein there are fewer interlacings between the warp and weft yarns than plain weave fabrics. Twill weaves are characterized by diagonal lines on the fabric.

"Yarn": a generic term for a continuous strand of textile fibers or filaments. Yarn occurs in the following forms:

1) a number of fibers twisted together,
2) a number of filaments laid together without twist;
3) a number of filaments laid together with a degree of twist;
4) a single filament with or without twist (monofilament).

BRIEF DESCRIPTION OF DRAWINGS

The invention will be described by way of example and with reference to the accompanying drawings in which:

FIG. 4 is a pattern for the first embodiment of the inventive fabric;

FIG. 5 is a pattern for the second embodiment of the inventive fabric ply; and

DETAILED DESCRIPTION OF THE INVENTION

Figure 1:
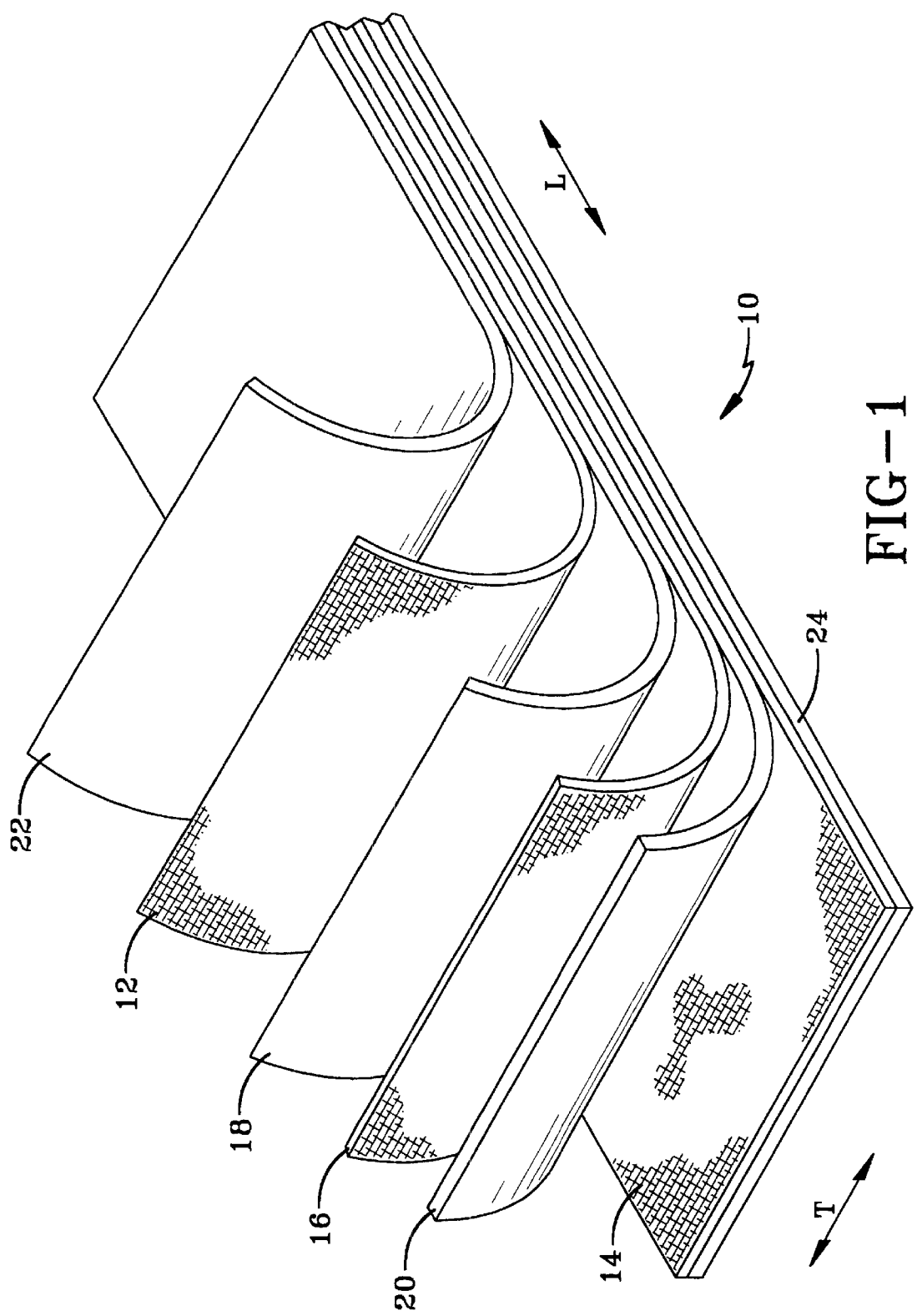
FIG. 1 is a perspective view of a belting employing the inventive fabric in one of the plies.

FIG. 1 illustrates a three-ply belting 10 employing the inventive fabric. The length of the belting 10 extends in the longitudinal direction L of the belt, while the width of the belting 10 extends in the transverse direction T of the belt. The belting 10 has a first outer fabric ply 12, a second outer fabric ply 14, and an inner fabric ply 16. Interposed between the fabric plies 12, 14, 16 are rubber skim layers 18, 20. Outward of each outer fabric ply 12, 14 is an additional rubber cover layer 22, 24. The relative thickness of the layers 12, 14, 16 are for illustrative purposes only. In each fabric ply, the warp yarns extend in the longitudinal direction L of the belt, while the weft yarns extend in the transverse direction T.

The outer plies 12, 14 of the belting 10 are woven fabrics. Nylon yarns are preferred for outer belting plies 12, 14 to provide the belt with desired characteristics of high impact energy absorption, high splice strength, low modulus for high flex fatigue and ability to run on relatively small diameter pulleys. Additionally, the use of nylon in the outer plies 12, 14 of multiple ply belting provides for superior fastener holding capability. Other low modulus materials, such as conventional polyester/nylon blended fabrics, may be used for the plies 12, 14.

To tailor and/or increase the transverse load support capabilities of the conveyor belting 10, the weft yarns of the outer plies 12, 14 may be formed with monofilaments for the weft yarns. For greater tailoring of the properties, the selective replacement of the weft yarns with monofilaments may be accomplished wherein only some of the weft yarns are replaced with monofilaments.

Figure 2:
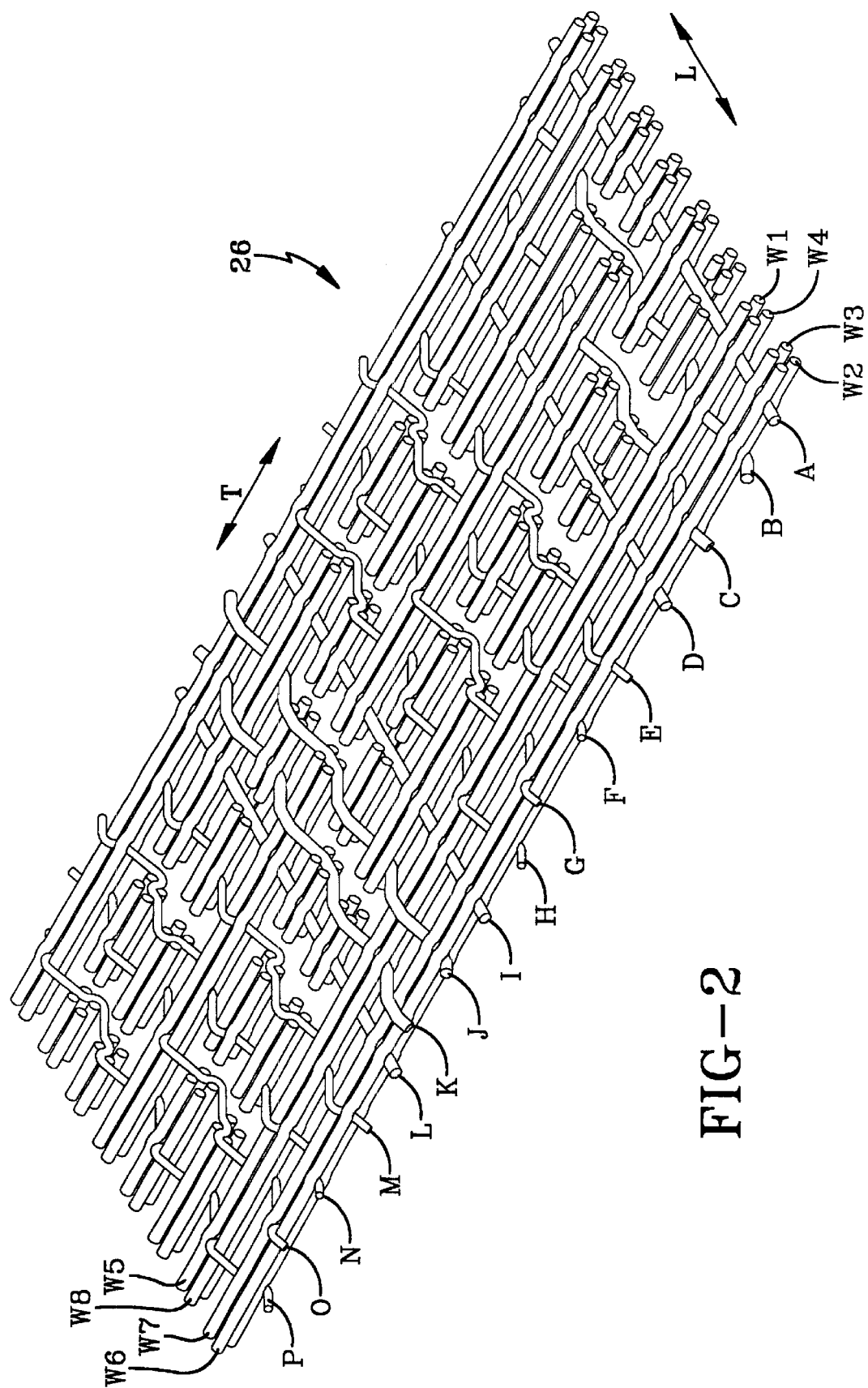
FIG. 2 is a schematic illustration of one embodiment of the inventive fabric.
Figure 3:
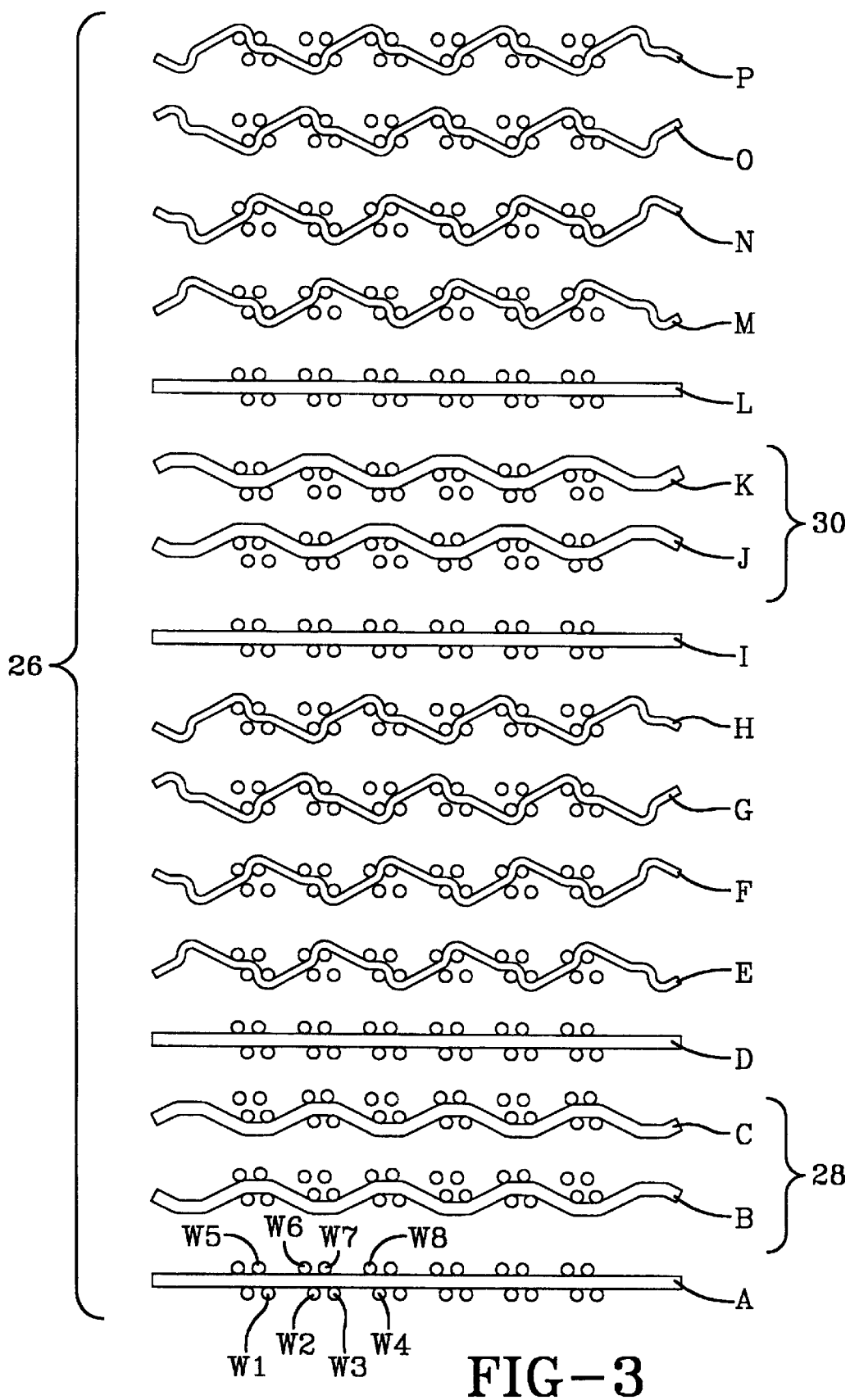
FIG. 3 is a breakdown of the layup order of one embodiment of the inventive fabric.

The center ply 16 of the multiple ply belt 10 is constructed with the inventive composite fabric 26; the fabric 26 being illustrated in FIGS. 2–6. As seen in FIG. 2, illustrating a first embodiment of the inventive fabric, the fabric 26 is a composite of an upper and a lower woven layer combined with intermediate straight warp yarns, bound together with binder yarns. The individual yarns and layers are also illustrated in FIGS. 3 and 4.

Each woven layer 28, 30 is defined by a set of repeating four weft yarns W1–W4 or W5–W8, with warp yarns B,C or J,K interlacing the weft yarns W1–W4 or W5–W8 in a twill pattern. Each woven layer 28, 30 by itself, appears as a loose twill weave (see also FIG. 6).

Between each woven layer 28, 30 are straight warp yarns A, D, I, or L. Tying the two woven layers 28, 30 and the straight warp yarns A, D, I, L together are at least one series of at binder yarns E–H, M–P. Each binder yarn E–H, M–P extends from a first woven layer 28 or 30 to the other woven layer 30 or 28.

To prepare the two woven layers 28, 30, the straight warp yarns A, D, I, L, and the binder yarns E–H, M–P, as a composite fabric, the fabric is woven in the following order, as illustrated in FIGS. 2–4. The weft yarns W1–W4 and W5–W8 of each woven layer 28, 30 are laid in adjacent layers. A first straight warp yarn A is laid between the weft yarns W1–W8. Warp yarns B, C are woven about weft yarns W1–W4 in a twill pattern, forming the first woven layer 28. A second straight warp yarn D is laid between the weft yarns W1–W8. A set of four binder yarns E–H are woven between the weft yarns W1–W8. Each binder yarn E–H extends from around only one weft yarn in a first woven layer 28 or 30 to only one weft yarn in a second woven layer 30 or 28. A third straight warp yarn I is laid between the weft yarns W1–W8. Warp yarns J, K are woven about weft yarns W5–W8 in a twill pattern, forming the second woven layer 30. A fourth straight warp yarn L is laid between the weft yarns W1–W8. A set of four binder yarns M–P are woven between the weft yarns W1–W8 similar to the first set of binder yarns E–H.

Figure 6:
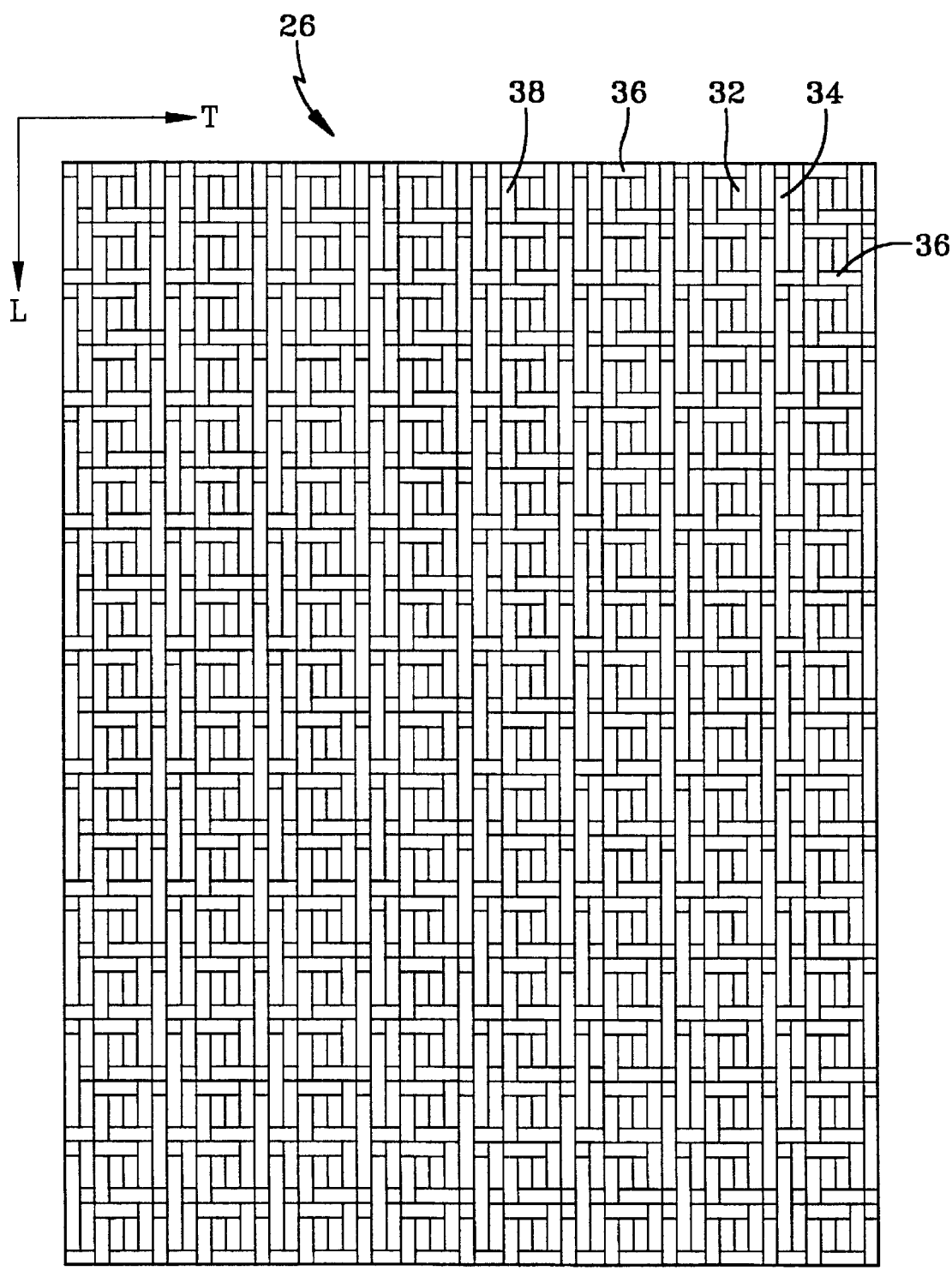
FIG. 6 is an illustration of the surface view of the inventive fabric.

FIG. 6 is illustrative of the surface view of the fabric 26. Straight warp yarns 32 are seen through the twill weave of warp 34 and weft 36 yarns of a first woven layer 28 or 30. Binder yarns 38 extend along the warp yarns 34 and the straight warp yarns 32.

The inventive reinforcing fabric may also be produced using less straight warp 32 and binder yarns 38 than that of the first embodiment as described so far. FIG. 5 illustrates the weaving pattern of the second embodiment 26' of the inventive fabric. Similar to the first embodiment, the fabric 26' is a composite of two woven layers with intermediate straight warp yarns, but with fewer straight warp yarns and fewer binder yarns. However, even with the decrease in the number of binder yarns 38 in the fabric 26', the total number of straight and surface warp yarns per inch are identical for the two fabric embodiments 26 and 26'.

The pattern draft for the fabric 26, 26' may also be modified to provide less than the illustrated two intermediate straight warp yarns or more than the illustrated four intermediate straight warp yarns. The number of intermediate straight warp yarns is dependent upon the yarn cord diameter, the type of material used, and the desired physical properties of the fabric.

The cord diameters for the straight warp 32 and woven warp 34 yarns are in the range of 1 to 4 mm, preferably 1.5 to 3.5 mm. The ratio of the cord diameter of the straight warp yarns 32 to the cord diameter of the woven warp yarns 34 is 1.25 to 0.75, preferably 1.10 to 0.90. The weft 36 and binder 38 yarns have an approximate diameter equal to 1.0–0.25 times the diameter of the straight warp 32 and solid woven warp 34 yarns.

Because of the diameter ratios of the straight warp 32 and woven warp 34 yarns, the relative denier strength of the yarns, and the pattern draft of the fabric, each distinct layer in the composite fabric, the two woven layers 28, 30 and the third layer formed by the straight warp yarns, contributes significantly to the physical properties of the fabric 26, 26'. Each layer contributes approximately 25–40% of the overall strength of the fabric 26, 26'.

To increase the transverse properties of the inventive fabric, either embodiment of the fabric 26 or 26' may be modified in the following manner. The weft yarns W1–W8, WW1–WW8 of each woven layer 28, 30 may be selectively replaced with monofilaments. Monofilament content of each woven layer 28, 30 may range from 10 to 75%. For 25% monofilament yarn content, every fourth weft yarn, i.e. every W1 or WW1 and every W8 or WW8, is a monofilament while the remaining weft yarns are spun or filament yarns. For 33% monofilament yarn content, every third weft yarn is a monofilament while the remaining weft yarns are spun or filament yarns. Fabrics 26 formed with monofilaments in this manner are useful when constructing a single ply belt with fabric 26 as the sole reinforcement means.

Following are exemplary constructions of the inventive fabric.

EXAMPLE 1

A fabric 26 is woven in accordance with the first embodiment, employing the construction of FIG. 4, to produce a 400 piw fabric ply. The following are the specifications for the yarns:

TABLE 1

| Yarn | Fiber Type | Size, denier | No. Plies | Twist |
| --- | --- | --- | --- | --- |
| Surface Warp | Polyester | 1000 | 9 | 3.0 A* |
| Straight Warp | Polyester | 1000 | 9 | 3.0 Z |
| Binder | Nylon | 1260 | 2 | 2.0 S |
| Weft | Nylon | 1890 | 3 | 2.5 S |

*alternate ends of the warp yarn are reverse twisted, i.e. S Z S Z . . .

EXAMPLE 2

A fabric 26' is woven in accordance with the second embodiment, employing the construction of FIG. 5, to produce a 400 piw fabric ply. The following are the specifications for the yarns:

TABLE 2

| Yarn | Fiber Type | Size, denier | No. Plies | Twist |
| --- | --- | --- | --- | --- |
| Surface Warp | Polyester | 1000 | 9 | 2.5 S |
| Straight Warp | Polyester | 1000 | 9 | 2.5 Z |
| Binder | Nylon | 1890 | 2 | 2.0 Z |
| Weft | Nylon | 1890 | 3 | 2.5 Z |

To increase the strength of the fabric 26, 26', the denier, number of plies, as well as the fiber type, may be varied. Also, as discussed above, selective filling of monofilament yarns for the weft yarns may be accomplished, as described in Examples 3 and 4.

EXAMPLE 3

A fabric 26 is woven in accordance with the first embodiment, employing the construction of FIG. 4, with every fourth weft yarn of the woven layers 28, 30 being a monofilament yarn. The resulting fabric is a 300 piw fabric ply. The following are the specifications for the yarns:

TABLE 3

| Yarn | Fiber Type | Size, denier | No. Plies | Twist |
| --- | --- | --- | --- | --- |
| Surface Warp | Polyester | 1000 | 6 | 3.5 A* |
| Straight Warp | Polyester | 1000 | 6 | 3.5 Z |
| Binder | Nylon | 1260 | 2 | 2.0 S |
| Weft | Nylon | 1260 | 5 | 2.5 S |
|  | Nylon | 0.9 mm | mono |  |

*alternate ends of the warp yarn are reverse twisted, i.e. S Z S Z . . .

EXAMPLE 4

A fabric 26 is woven in accordance with the first embodiment, employing the construction of FIG. 4, with every third weft yarn of the woven layers 28, 30 being a monofilament yarn. The resulting fabric is a 300 piw fabric ply. The following are the specifications for the yarns:

TABLE 3

| Yarn | Fiber Type | Size, denier | No. Plies | Twist |
| --- | --- | --- | --- | --- |
| Surface Warp | Polyester | 1000 | 6 | 3.5 A* |
| Straight Warp | Polyester | 1000 | 6 | 3.5 Z |
| Binder | Nylon | 1260 | 2 | 2.0 S |
| Weft | Nylon | 1260 | 5 | 2.5 S |
|  | Nylon | 0.9 mm | mono |  |

*alternate ends of the warp yarn are reverse twisted, i.e. S Z S Z . . .

Each example employs a combination of polyester and nylon yarns for the fabric 26, 26'. Any conventional yarn may be selected for forming the fabric 26, 26', including, but not limited to, aramid, polyester, nylon, and nylon/polyester blends.

Fabric 26, 26' may be employed in multiple ply belting 10, as illustrated in FIG. 1 or in single ply belting (not illustrated). When the fabric 26 is used in multiple ply belting 10, the fabric 26 forms at least one center ply and provides the belt with 50 to 75% of the overall belt strength. The outer plies 12, 14 provide 25 to 50% of the overall belt strength. Such multiple ply belts 10 are useful in all heavy-duty belt applications. Examples of such applications are coal mining, hard rock mining (copper, gold), taconite, sand and gravel. Multiple ply belt with the inventive fabric as at least one center ply yield a longer life due to their superior belt properties.

To increase the load capacity of such heavy duty multiple ply belts 10, while retaining 50 to 75% of the belt strength in the center plies constructed according to the inventive fabric construction, the strengths of each layer may be varied as well as the number of layers. The following Table 5 are multiple examples of multiple ply belt carcass structures, wherein the center plies are constructed in accordance with the present invention:

TABLE 5

| Belt No. | Top Ply(s), #; strength | Center Ply(s), #; strength | Bottom Ply(s), #; strength | Belt Rating PIW* |
|---|---|---|---|---|
| 1 | 1; 50 piw* | 1; 200 piw | 1; 50 piw | 300 |
| 2 | 1; 100 piw | 1; 200 piw | 1; 100 piw | 400 |
| 3 | 1; 100 piw | 1; 400 piw | 1; 100 piw | 600 |
| 4 | 1; 100 piw | 1; 600 piw | 1; 100 piw | 800 |
| 5 | 1; 150 piw | 1; 500 piw | 1; 150 piw | 800 |
| 6 | 2; 100 piw each | 1; 600 piw | 2; 100 piw each | 1000 |
| 7 | 1; 100 piw | 1; 800 piw | 1; 100 piw | 1000 |
| 8 | 1; 100 piw | 2; 400 piw each | 1; 100 piw | 1000 |
| 9 | 1; 100 piw | 2; 500 piw each | 1; 100 piw | 1200 |

*piw: pounds per inch width

As previously noted, the inventive fabric may be employed as the sole reinforcing means within a belting. Such a single ply belting has applications in such fields as hay baler belting and other agricultural applications, as well as light industrial conveyor belt applications, including pvc belting.

Variations in the present invention are possible in light of the description of it provided herein. While certain representative embodiments and details have been shown for the purpose of illustration the subject invention, it will be apparent to those skilled in this art that various changes and modifications can be made therein without departing from the scope of the subject invention. It is, therefore, to be understood that changes can be made in the particular embodiments described which will be within the full-intended scope of the invention as defined by the following appended claims.

What is claimed is:

1. A belting (10) comprising at least one composite fabric ply (26) and a cover layer (22, 24) located on each side of the composite fabric ply (26), the composite fabric ply (26) comprising a first and a second woven layer (28, 30), and a third layer comprising a plurality of straight warp yarns (32) located between the first and second layers (28, 30), wherein each of said layers directly contacts each other each woven layer (28, 30) and third layer (32) each contributing 25–40% to the overall strength of the fabric (26).

2. A belting (10) in accordance with claim 1 wherein each woven layer (28, 30) and the third layer (32) contribute substantially equally to the overall strength of the fabric.

3. A belting (10) in accordance with claim 1 further comprising at least one fabric ply (12) provided on an upper side of the composite fabric ply (26) and at least one fabric ply (14) provided on a lower side of the composite fabric ply (26).

4. A belting (10) in accordance with claim 1 or 3 wherein the belting (10) comprises at least two reinforcing plies of the composite fabric ply (26).

5. A belting (10) in accordance with claim 3 wherein the composite fabric ply (26) provides the belting (10) with 50 to 75% of the overall belting strength.

6. A belting (10) in accordance with claim 1 wherein the straight warp yarns (32) have a cord diameter of 1 to 4 mm.

7. A belting (10) in accordance with claim 1 wherein the first and second woven layers (28, 30) and the straight warp yarns (32) of the third layer are interconnected by a plurality of binder yarns (38).

8. A belting (10) in accordance with claim 1 wherein the first and second layers (28, 30) are comprised of warp (34) and weft (36) yarns woven in a twill pattern.

9. A belting (10) in accordance with claim 8 wherein 10 to 75% of the weft yarns (36) are monofilament cords.

10. A belting (10) in accordance with claim 1 wherein the warp (34), weft (36) and straight warp yarns (32) are selected from the group consisting of polyester, nylon, nylon/polyester blends, and aramid.

11. A belting (10) in accordance with claim 1 wherein the cover layer is formed of a rubber or pvc material.

* * * * *